United States Patent [19]
Budeit

[11] Patent Number: 6,033,562
[45] Date of Patent: Mar. 7, 2000

[54] APPARATUS FOR AERATING WASTEWATER FROM PRESSURIZED OR GRAVITY FLOW SOURCES

[76] Inventor: Donald A Budeit, 80 Eicher Rd., Pittsburgh, Pa. 15237

[21] Appl. No.: 09/141,977

[22] Filed: Aug. 28, 1998

[51] Int. Cl.[7] .................................................. C02F 1/72
[52] U.S. Cl. .................... 210/199; 210/220; 261/123; 261/124
[58] Field of Search .................... 210/170, 198.1, 210/199, 205, 220, 512.1, 912; 261/123, 124

[56] References Cited

U.S. PATENT DOCUMENTS

| | | | |
|---|---|---|---|
| 2,820,620 | 1/1958 | Anderson | 210/512.1 |
| 3,051,315 | 8/1962 | Boester | 210/220 |
| 3,054,602 | 9/1962 | Proudman | 210/220 |
| 3,289,608 | 12/1966 | Laval, Jr. | 210/512.1 |
| 3,841,997 | 10/1974 | McGee | 210/220 |
| 5,273,664 | 12/1993 | Schulz | 210/199 |

*Primary Examiner*—David A. Simmons
*Assistant Examiner*—Frank M. Lawrence

[57] ABSTRACT

An apparatus and method for single pass mass transfer of oxygen into a liquid. The apparatus comprises individual aeration modules contiguously aligned to allow continuous gravity flow liquid to be permeated with oxygen repetitively as it passes through a successive series of reaction chambers. The invention provides furthermore a novel apparatus to interject into liquids high volumes of low-pressure air to effect mass transfer of oxygen.

5 Claims, 5 Drawing Sheets

APPARATUS FOR AERATING WASTEWATER FROM PRESSURIZED OR GRAVITY FLOW SOURCES

BACKGROUND OF THE INVENTION

1. Field of the Invention

The present invention relates to an apparatus for intimate mixing of solids, liquids, gases, and more particularly relates to aeration associated with wastewater treatment.

2. Description of Prior Art

There are many different types of aerators used for a variety of diverse needs and processes. There are disadvantages to all of them.

Surface aerators contain motor driven propellers and are anchored in place on the surface of basins or ponds to agitate wastewater and transfer oxygen. Most surface aerators in use require 25 to 100 horsepower each and most installations have multiple units to fulfill aeration requirements. High-energy consumption makes them expensive to operate. Surface aerators also have moving components in direct contact with the water they aerate. This causes time consuming downtime and high maintenance costs. Due to their size, their weight and their placement in large bodies of water another disadvantage is in the need for crane type equipment to remove them for maintenance, repair or replacement.

Fine bubble diffusers are another type of aeration device. This type of device is placed at the bottom of basins with water depth of 4 to 5 meters (13 to 16 feet). The depth at which these units are placed requires relatively high pressures to overcome the weight of the water above them. High pressure translates into high-energy consumption, which translates into high costs.

As its name implies, the openings in these units that discharge air into water are miniscule in size. This makes them susceptible to clogging.

Another type of aeration device is the Sparging Ring. Sparging Rings are placed at the bottom of basins at depths of 4 to 5 meters (13 to 16 feet). Sparging Rings require relatively high pressure, have high-energy usage and high costs. Turbines are used with these devices to break up the size of the air bubbles and to mix the large volumes of liquid contained within the basin. Turbines are high-energy consumption devices, have moving parts in direct contact with the liquid and are high maintenance devices.

One of the newer types of aeration devices is the Aspiration Stripper. This type of device aspirates free air. Liquid to be aerated is pumped through a multitude of orifices within the unit. In order to aspirate air, liquid is pumped though these devices at pressures that may exceed 50 PSI. High pressure requires high-energy input, which translates to high costs. The small, elongated orifices in the units make them susceptible to clogging. Pre-filtering is often required. This type of aeration device is limited in the amount of aspirated air available to transfer oxygen into liquid. When a process has high oxygen demand, this type of device has to recycle liquid already processed. The susceptibility to clogging, high-energy requirement, and recycling requirement in high oxygen transfer applications are disadvantages of this type of aeration device.

In summation, all of these Prior Art aeration devices have distinct disadvantages.

SUMMARY OF THE INVENTION

Figure 1:
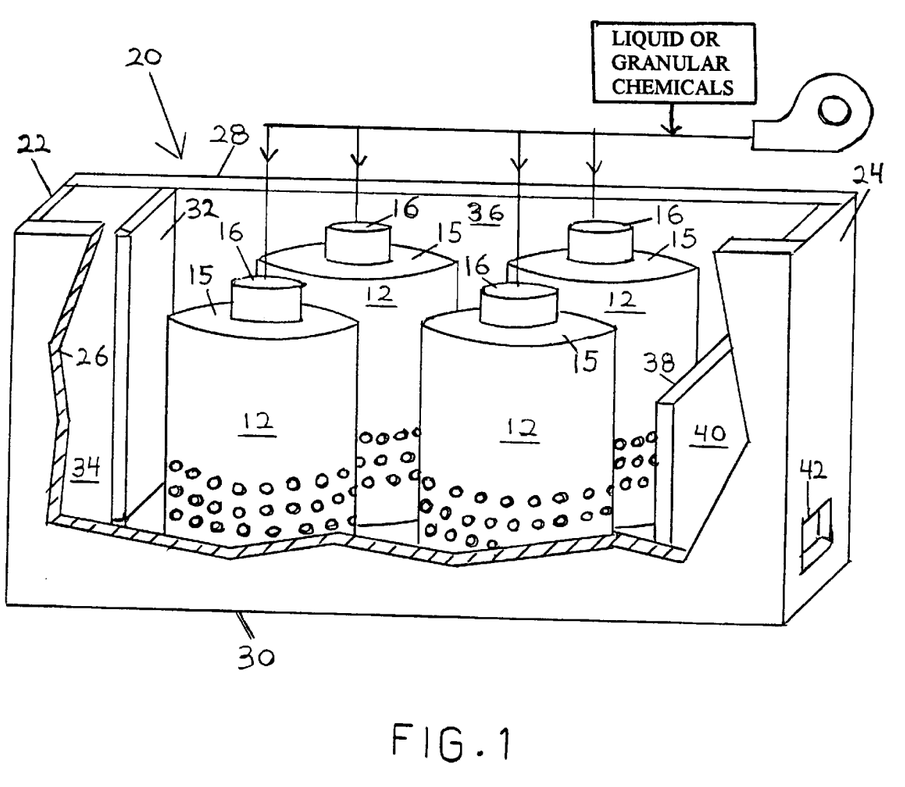
FIG. 1. is a perspective view partially broken away to show the three chambers of a single aeration module containing four aerators.

The present invention overcomes the disadvantages of Prior Art aeration devices. My aerator is comprised of a container. The container has an inlet port in communication with a source of pressurized air that is expelled from the container through a multiplicity of apertures. The apertures are arranged in one or more rows. The apertures have a novel configuration that projects expelled air into any predetermined rotation, direction or angle. Another novel aspect of the aerator is that the apertures have no appreciable depth. A major advantage of these apertures is that potential for clogging is minimized. There is no depth to the apertures for mass to adhere to. In addition, the high volume of air expelled through the apertures make them self-cleansing. In one embodiment of my invention, the aerator described is an integral part of an aeration module for continuous gravity flow treatment of liquids. This embodiment is shown in FIG. 1. My aeration module is comprised of three chambers; an infusion chamber; a reaction chamber containing one or more aerators; and a discharge chamber. A baffle wall separates the infusion chamber from the reaction chamber. A divider wall of lesser height than the baffle wall separates the reaction chamber from the discharge chamber. The discharge chamber has an opening at the base for discharge of effluent. Continuously flowing liquid is introduced to the infusion chamber from pressurized or gravity flow sources. It flows under the baffle wall and rises in the reaction chamber. The aerators within the reaction chamber expel high volume low-pressure air into the liquid in a predetermined upward canted radial flow. The impact of the aerated liquid against the sides of the reaction chamber, the thrust of colliding flows created by additional aerators within the same reaction chamber, the upward direction of the expelled air, and the turbulence and upheaval caused by the large volume of air combines to transfer oxygen into the liquid. The upheaval propels the liquid over the top of the divider wall and into the discharge chamber. The effluent flows from the discharge chamber through the opening at the base of the chamber.

Figure 5:
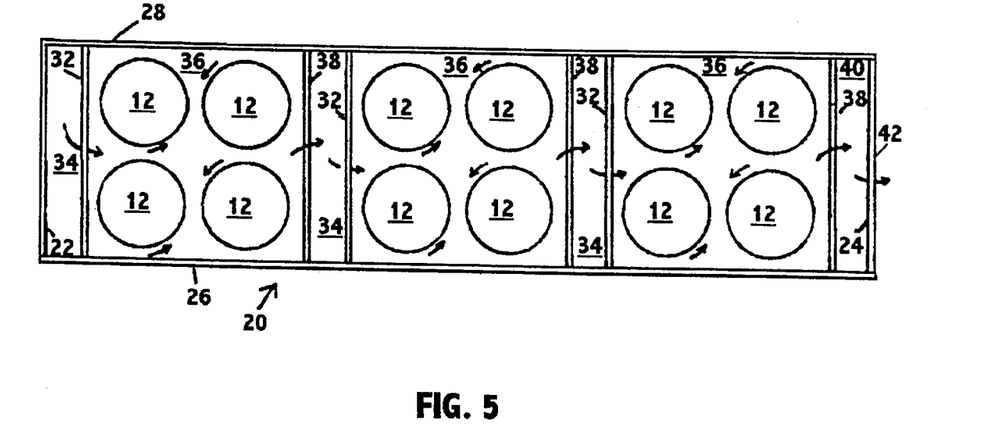
FIG. 5. is a plan view from above showing the arrangement of three contiguous aeration modules.

Another embodiment as shown in FIG. 5 is a contiguous series of aeration modules. The discharge chamber shown in FIG. 1 and described in the previous embodiment is eliminated in all modules except the final one of a series. For example: a series of three aeration modules would have this chamber lineup.

Infusion-Reaction-Infusion-Reaction-Infusion-Reaction-Discharge

Figure 6:
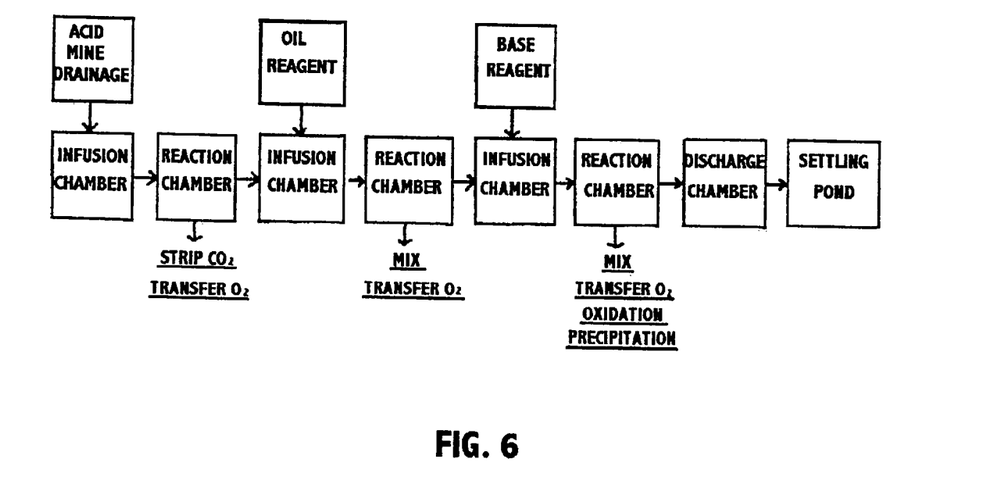
FIG. 6. is a flow chart showing treatment of acid mine drainage as detailed in the summary. The treatment is in three contiguous modules as shown in FIG. 5.

Treatment of Acid Mine Drainage provides a good example of the operation of a contiguous series of aeration modules with each module containing four aerators. Acid Mine Drainage is acidic water associated with mining. It must be treated to meet federal discharge requirements. It may contain all of the following: carbon dioxide; longwall emulsion oil; pH less than 6; dissolved iron and/or dissolved manganese. FIG. 6 is a flowchart of treatment in three contiguous aeration modules as is now described.

Aeration Module 1: Acid Mine Drainage is introduced continuously from pressurized or gravity flow sources into the infusion chamber of the first aeration module. It flows under the baffle wall and rises in the reaction chamber. High volume, low-pressure air is expelled into the liquid from the aerators within the reaction chamber creating turbulence and wake flow. The turbulence and upheaval, caused by the large volume of air, combine to transfer oxygen to the liquid and strip carbon dioxide from it. The upheaval propels the liquid over the divider wall into a second aeration module.

Aeration Module 2: Liquid from the reaction chamber of the first aeration module is propelled into the infusion chamber of the second aeration module. A chemical reagent formulated to break down emulsion oil is introduced by existing methods into the liquid flowing in the infusion chamber. The liquid and reagent flows under the baffle in this second aeration module and rises in the reaction chamber containing the aerators. The interaction of air and liquids described in the reaction chamber of aeration module 1 is repeated in the reaction chamber of aeration module 2. In this reaction chamber, the reagent and liquid are homogenized, oxygen is transferred to the mixture, and the emulsion oil is broken down. Liquid is propelled over the divider wall of this second aeration module into a third aeration module.

Aeration Module 3: Liquid from the reaction chamber of the second aeration module is propelled into the infusion chamber of the third aeration module. A base reagent to raise pH is introduced by existing methods into the liquid flowing in the infusion chamber.

The liquid and reagent flows under the baffle in this third aeration module and rises in the reaction chamber containing yet another four aerators. The interaction of air and liquid described in the reaction chamber of aeration module 1 and repeated in aeration module 2 is again repeated in the reaction chamber of aeration module 3. In this reaction chamber, the base reagent and the liquid are intimately mixed and homogenized, dissolved iron is oxidized and precipitated, dissolved manganese and other metals are oxidized and precipitated or co-precipitated with the iron. The turbulence created by the aerators keeps the precipitated solids in suspension in the liquid as it is propelled over the divider wall of this third aeration module into the discharge chamber shown in FIG. 1 and described in the previous embodiment. The effluent flows from the discharge chamber through the opening at the bottom of the chamber.

In this example, a series of three aeration modules are aligned for continuous gravity flow processing of wastewater. Additional aeration modules can be aligned as needed. Effective economical single pass treatment is made possible by the novel configuration of the modules which process wastewater sequentially by force of gravity.

The Acid Mine Drainage example exemplifies several of the advantages of my aerator and aeration modules. In one continuous operation my apparatus stripped carbon dioxide, mixed and agitated reagent to break down emulsion oil, mixed base reagent to raise pH and neutralize acidity, transferred oxygen to oxidize and precipitate metals, and provided turbulence to keep precipitated metals in suspension.

My aeration modules can separately process liquids having diverse treatment requirements and do so on a continuous flow basis without pumps, without recycling, without mixers, and without contacting liquid with moving parts.

Additional Advantages Over Prior Art

Conservation of Energy

The present invention can use pressure of less than 35 centimeters $H_2O$ (0.5 PSI) to provide the volume of air necessary for high oxygen demand applications.

Horsepower and pressure are directly related. Fine bubble diffusers operating at their normal depth of 4.27 meters (14 feet) would require 14 times the horsepower to provide equal standard cubic meters of air or would provide only 7 percent of the volume at equal horsepower. Surface aerators operate in large basins or ponds that provide retention time and require multiple aerators using 25–100 horsepower each. Pre-aeration ponds to strip carbon dioxide require additional aerators. Sparging rings with turbine mixers, like fine bubble diffusers, are normally 4.27 meters (14 feet) below the surface of the water they treat and require high horsepower to standard cubic meters (standard cubic feet) of air delivered. Turbine mixers to agitate the water to keep solids in suspension add to the horsepower requirement. Aspiration strippers and mixers use pressures up to 3515 centimeters $H_2O$ (50 PSI) to pump water through orifices to aspirate air. When oxygen demand is high, these devices must recycle the effluent one or more times, which doubles or triples power consumption and costs.

Reduced Maintenance Requirements

My aerator and aeration modules minimize the potential for clogging. The novel aspect of the apertures having no appreciable depth for mass to adhere to virtually eliminates clogging. Passage of large volumes of air through the apertures tends to make them self-cleansing. Neither the aerators nor the modules have moving parts in contact with liquids. These features eliminate problem areas and reduce the need for maintenance and repair. Fine bubble diffusers have miniscule openings to discharge air and are susceptible to clogging. Acid mine drainage treatment creates tons of solids and gypsum per day, which makes this type of aerator unsuitable for this purpose. Surface aerators are in direct contact with the water they aerate and are prone to breakdowns and have high maintenance requirements. Sparging rings with turbine mixers are in direct contact with the water they aerate, are prone to breakdowns and have high maintenance requirements. Aspiration mixers use water pressure through elongated orifices to aspirate air. These orifices are susceptible to clogging particularly if processed water is recycled through them.

Decreased Operating Costs

My aerator and aeration modules conserve energy relative to prior art. Lower energy consumption relates to decreased costs. Energy requirements can be reduced by a factor of 5 or more. Low maintenance requirements are also a factor in reducing costs.

OBJECTS OF THE PRESENT INVENTION

The primary object of my aerator and aeration module is to provide an apparatus to effectively transfer into liquid whatever amount of oxygen the process may require. The oxidation and precipitation of ferrous iron from acidic water requires one milligram of oxygen for every seven milligrams of iron. Treatment of acidic water containing one thousand milligrams per liter of iron requires one hundred forty three milligrams per liter of oxygen. When nine milligrams of oxygen equals saturation of water, compete oxidation of one thousand milligrams of iron per liter requires fifteen times saturation. Acidic flows often exceed ten thousand liters (2645 gallons) per minute. A contiguous series of my aeration modules can process continuous flow having high oxygen demand by transferring oxygen into the same water several times at it passes through successive reaction chambers. Continuous gravity flow treatment, which eliminates the need for pumps or recycling and low-pressure, high volume air which reduces energy consumption, combine to make this a cost effective apparatus for high oxygen demand processes.

Another object of my aerator and aeration module is to provide an apparatus to effectively process liquids at lower operating cost. This is accomplished through decreased energy consumption and lowered maintenance costs. Fine bubble diffusers, Sparging rings, surface aerators, and aspiration strippers all have high energy and maintenance requirements.

Yet another object of my aerator and aeration module is to provide an efficient apparatus for mixing of liquids with other liquids or solids. This is accomplished by the unique way liquids are processed. Every liter introduced into these modules enters at the bottom of the individual reaction chamber. The upward radial thrust of the liquids combined with the turbulence and upheaval from large volumes of air expelled into a relatively small area provide efficient mixing.

Another object of my aerator and aeration module is to provide an apparatus for effective precipitation of dissolved metals through simultaneous neutralization and oxidation.

Yet another object of my aerator and aeration module is to provide an apparatus to create the agitation and turbulence necessary to keep precipitated solids in suspension.

Still another object of my aerator and aeration module is to provide an apparatus that provides adequate individual retention times for different reactions by increasing the capacity of reaction chambers or by using more than one reaction chamber for the same reaction.

Another object of my aerator and aeration module is to provide an apparatus that will eliminate short-circuiting or laminar flow of liquids that would result in incomplete processing.

Another object of my aerator and aeration module is to provide a vehicle for processing liquids requiring several individual steps and to do so on a continuous basis without pumps or mixers.

Still another object of my aerator and aeration module is to provide the vehicle to mix chemical reagents into waste water more efficiently than prior art in order to reduce the amount of reagent used and thus lower treatment costs.

A further object of my aerator and aeration module is to provide an apparatus for economical removal of volatile organic compounds from liquids. Many processes treating liquids containing volatile organic compounds must recycle the liquid to reduce the amount of volatile organic compounds to acceptable levels. Each recycle increases treatment costs by a factor of one. A series of contiguous aeration modules receiving large volumes of air from the manifold of a single source can aerate the same liquid repeatedly in successive modules as it flows through them.

Another object of my aerator and aeration module relates to such apparatus for receiving liquid or granular chemical reagent directly into the aerator as pneumatically conveyed from the source of air and expelling it into liquid for efficient mixing.

Still another object of my aerator and aeration module is to provide an apparatus that can manipulate pH in a single pass by mixing acids and bases in separate successive reaction chambers and provide each with adequate retention time to optimize their individual reactions while eliminating pumps and mixers.

Yet another object of my aerator and aeration module is to provide an apparatus for stripping gases and volatile organic compounds from liquids; for mixing of solids, liquids and gases; for manipulation of pH; for oxygenation and precipitation of metals; for agitation to keep precipitated solids in suspension, and for performing all of the above cost effectively with continuous flowing liquid in a single pass without pumps or mixers.

Another object of my aerator and aeration module is to provide an apparatus to effectively function in all the ways recited and be a low maintenance, easily serviced apparatus. The apparatus has novel apertures that virtually eliminate clogging and the apparatus contains no moving parts in contact with liquid that would increase maintenance. The only moving part in the entire sequence of operation of my aerator and aeration module is the source of air, which forms no part of the present invention. Other than the source of air, the only serviceable part is the aerator itself and it consists of a single part and is easily serviced.

It should be apparent from all the foregoing that my aerator and aeration module are a novel invention that has numerous advantages over prior art and eliminates the disadvantages.

Prototype—Field Tests and Results

A prototype of my aerator and aeration module was field tested at several sites. Water chemistry varied widely. Cost effective treatment to meet the discharge permit requirements of National Pollutant Discharge Elimination System (NPDES) required diverse reactions within the treatment system.

Examples of results of testing are as follows:

Example #1

Scrub-grass Run

Scrub-grass Run is a tributary of Chartiers Creek which flows into the Ohio River in Western Pennsylvania. It is polluted with acid mine drainage from an abandoned mine and generates 50 tons of iron annually.

A two cell passive treatment wetland was previously constructed at this site to treat the 300 gallon per minute outflow. The wetland, as constructed, is not capable of properly treating the outflow and 50 percent is diverted directly into Scrub-Grass Run and by-passes the two treatment ponds. A comparison of treatment results of the passive system and my aeration module are shown in Chart #1. No chemical reagent was used for either treatment. Raw water influent to the Aeration Module was directly from the source.

| Chart #1 | | | |
|---|---|---|---|
| | Raw Water Influent | Passive Treatment Effluent | Aeration Module Effluent |
| pH | 6.7 | 6.8 | 7.4 |
| Iron FE++ | 74.8 mg/l | 48.6 mg/l | 0.52 mg/l |
| Manganese | 0.66 mg/l | 0.67 mg/l | 0.60 mg/l |
| Acidity | 121 mg/l | Neg. | Neg. |
| Alkalinity | 169 mg/l | 69 mg/l | 38 mg/l |
| Total Suspended Solids | 6 mg/l | 69 mg/l | <5 mg/l |

Conclusion

My aeration module is a viable apparatus and method for treatment of Acid Mine Drainage. At abandoned mine sites where the outflow is net alkaline and pH higher than 6, it requires no chemical reagent and can be used alone or in conjunction with passive treatment methods to reduce pond sizing requirements.

The Aeration Module is an effective environmental tool.

Example #2

Deep Mine Acid Mine Drainage

Four thousand gallons per minute of Acid Mine Drainage is currently being pumped from an inactive mine in western Pennsylvania and must be treated in perpetuity. Current treatment costs for quick lime are approximately two hundred thousand dollars per year.

A portion of the raw water was diverted to the aeration module. No chemical reagent was used. Results are shown in Chart #2.

Chart #2

|  | Raw Water Influent | Aeration Module Effluent |
|---|---|---|
| pH | 6.5 | 8.5 |
| Acidity | 38 mg/l | Neg. |
| Alkalinity | 315 mg/l | 268 mg/l |
| $CO_2$ | 320 mg/l | 76 mg/l |
| Fe ++ | 28 mg/l | <0.05 mg/l |
| Manganese | 1.7 mg/l | 0.62 mg/l |

Conclusion

More than 75% of the carbon dioxide was stripped from the Acid Mind Drainage and pH was raised 2 full points without any chemical reagent being used in the treatment. The turbulent action within the Aeration Module and transfer of oxygen combined to effectively strip $CO_2$, raise the pH and oxidize and precipitate the metals. In addition to the savings for chemical reagent, an installation of my Aeration Module would eliminate the use of the following equipment currently in use:

Lime Silo and gyrator

Lime slacker and drive system

Sludge recycle pump

Sludge mix tank and mixers

Current aeration system

Reaction tank and mixers

Energy would be conserved and reagent costs and high maintenance equipment eliminated.

My Aerator and Aeration Module conserves energy and is an effective environmental tool.

Example #3

Refuse Pile Runoff

A large coal stripper in western Pennsylvania operates a coal preparation facility. A hugh refuse pile has been created from the waste. Water from the wet refuse and rainfall contribute to acid mine drainage seeps totaling more than two hundred gallons per minute. This outflow must be treated to meet National Pollutant Discharge Elimination System (NPDES) permit limitations.

A portion of the flow was processed through the Aeration Module prototype. Hydrated lime was introduced into the infusion chamber to raise the pH, neutralize the acidity and precipitate the metals. Results are shown in Chart 3.

Chart #3

|  | Raw Water Influent | Aeration Module Effluent |
|---|---|---|
| pH | 3.1 | 7.7 |
| Acidity | 20258 mg/l | Neg. |
| Alkalinity | 0 | 11 mg/l |
| Sulfate | 23000 mg/l | 2500 mg/l |
| Iron FE++ | 8850 mg/l | 0.92 mg/l |
| Aluminum | 381 mg/l | <0.1 mg/l |
| Manganese | 76 mg/l | 1.30 mg/l |

Conclusion

Very few sites anywhere have comparable chemistry. The effluent from my Aeration Module met NPDES permit limits. Hydrated lime consumption was 40% below current treatment costs. One milligram per liter of oxygen will oxidize seven milligrams per liter of ferrous iron. It requires 1264 milligrams of oxygen to oxidize 8850 milligrams of ferrous iron. Using 9 mg/l oxygen as saturation of water, my Aerator and Aeration Module transferred the saturation amount 140 times for each liter of acid mine drainage processed. Flow through the Aeration Module was continuous with approximately one minute pass through time.

These three examples show the effectiveness of my Aerator and Aeration Module in the treatment of Acid Mine Drainage (AMD). Their use is not limited to AMD. These test results show the effectiveness in stripping carbon dioxide and transfer of oxygen. Other volatile organic compounds can be stripped and other industrial waste waters can be treated. The effects of acid rain can be mitigated.

My Aerator and Aeration Module is an effective environmental tool.

BRIEF DESCRIPTION OF DRAWINGS

The invention will be better understood and objects other than that set forth will become apparent when consideration is given to the following descriptions thereof.

DESCRIPTION OF THE PREFERRED EMBODIMENT

Figures 2, 2A:
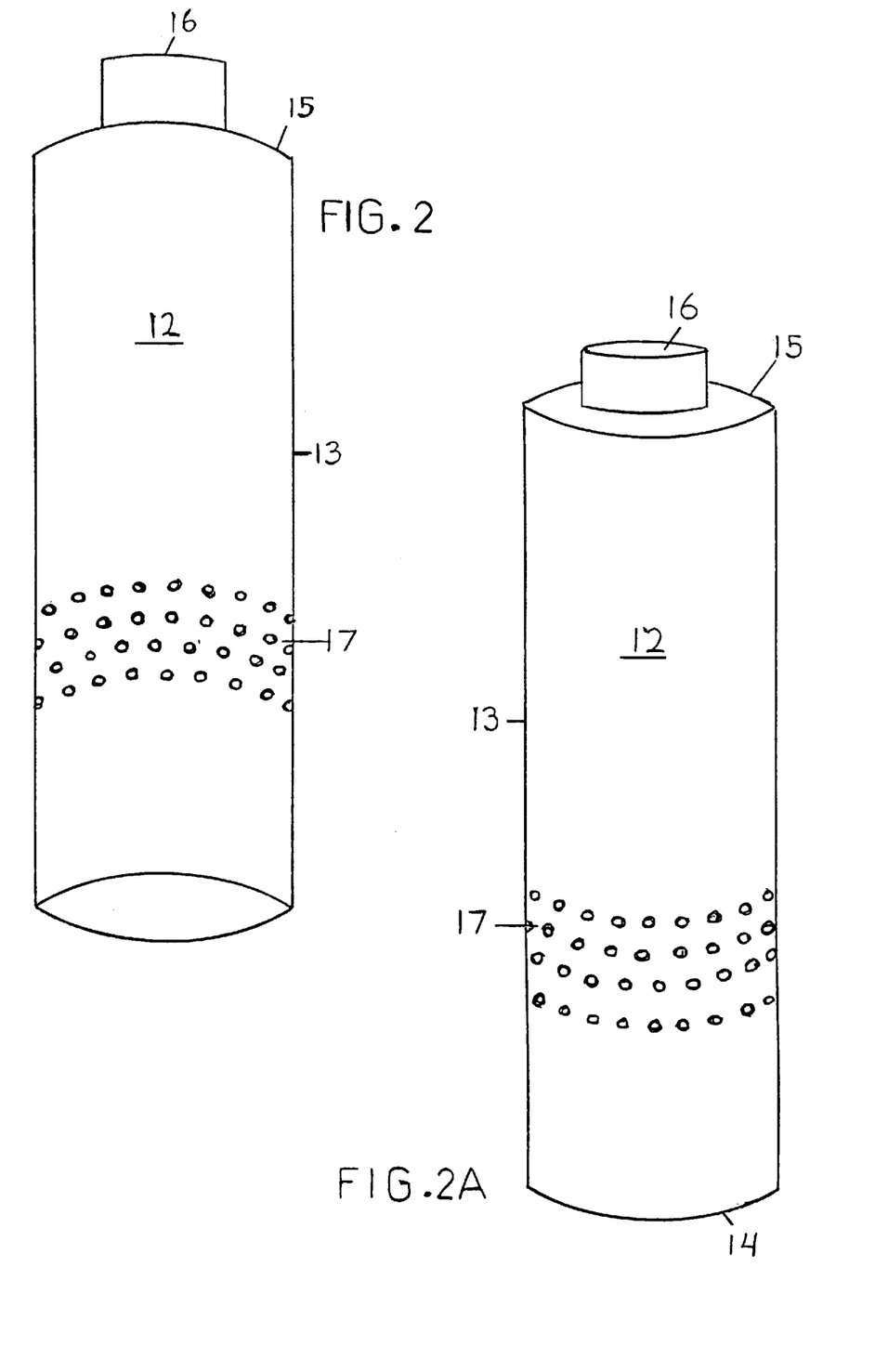
FIG. 2. is a view of an aerator which is open at the base and which contains novel apertures.
FIG. 2A. shows an enclosed aerator.
Figure 3:
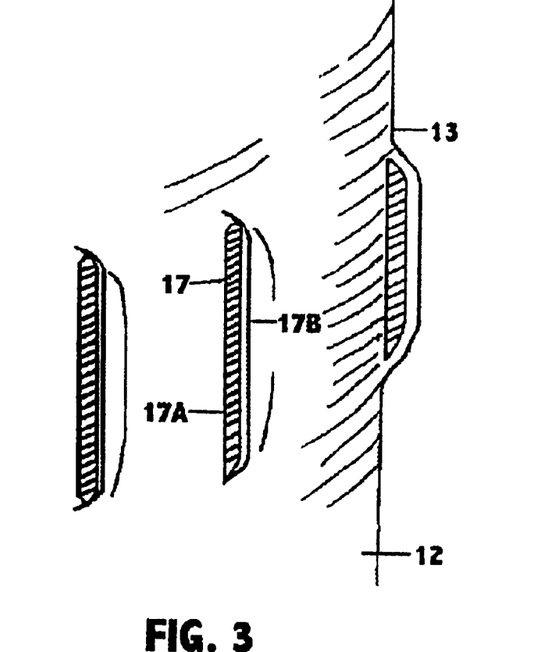
FIG. 3. shows slit shaped apertures pre-set for clockwise flow.
Figure 3A:
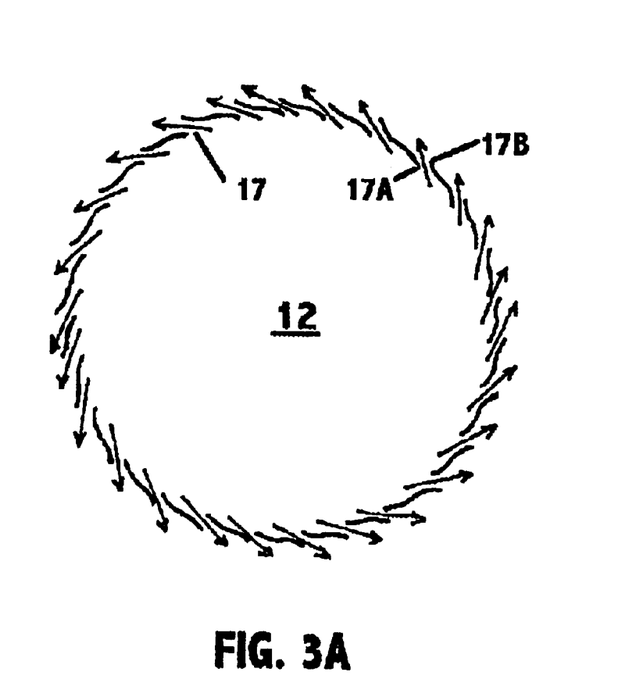
FIG. 3A. is a horizontal cross section view of the cylindrical aerator shown in FIG. 2.

With reference to FIG. 1, an aeration module 20 is comprised of an upstream end wall 22, a downstream end wall 24, and a pair of sidewalls 26 and 28. End walls 22 and 24 and sidewalls 26 and 28 are interconnected and are of equal height. End walls 22 and 24 and sidewalls 26 and 28 are interconnected with a bottom 30. A baffle wall 32 is interconnected to sidewalls 26 and 28. Baffle wall 32 extends to the top edge of sidewalls 26 and 28. The lower edge of baffle wall 32 terminates above bottom 30 so as to leave an open channel for underflow of liquid. A divider wall 38 is interconnected with sidewalls 26 and 28 and bottom 30. Divider wall 38 is of lesser height than baffle wall 32 and endwalls 22 and 24. Spacing between end wall 22 and baffle wall 32 forms an infusion chamber 34. Spacing between baffle wall 32 and divider wall 38 forms a reaction chamber 36. Spacing between divider wall 38 and end wall 24 forms a discharge chamber 40. An opening 42 is at the base of end wall 24. A plurality of aerators 12 is positioned within reaction chamber 36 and is an integral part of aeration module 20. With reference to FIG. 2, Aerator 12 is comprised of a cylindrical container 13, with a top 15 and an inlet port 16. Inlet port 16 is in communication with a source of high volume, low-pressure air. Container 13 has a multiplicity of apertures 17 arranged in one or more rows around its circumference. Apertures 17 have a depressed leading edge 17A and a raised trailing edge 17B. Leading edge 17A and trailing edge 17B are diametrically opposed. Leading edge 17A and trailing edge 17B of apertures 17 are formed at any predetermined angle to expel air in a pre-determined direction or rotation. The force and angle of the expelled air into liquid flowing into reaction chamber 36 during processing determines the rotation of the liquid. Container 13 can be constructed with a material having a wall thickness of less than 1.58 millimeters (0.0625 inch). The novel design of apertures 17 enables control in direction and rotation. The aspect of apertures 17 being formed in a thin wall material virtually eliminates clogging. Apertures 17 have no appreciable depth for mass to adhere to. In addition, high SCFM of air expelled through apertures 17 make them self-cleansing.

Liquid to be processed in aeration module 20 is introduced to infusion chamber 34 from pressurized or gravity flow sources. The liquid flows under baffle wall 32 and rises in reaction chamber 36. Aerators 12 reside within reaction chamber 36. High volume, low-pressure air is transmitted from a source of pressurized air to aerators 12 through inlet port 16. Air is expelled from aerators 12 through apertures 17 into the liquid flowing into reaction chamber 36. The impact of the aerated liquid against the sides of reaction chamber 36, the thrust of colliding flow created by multiple aerators 12 within the same reaction chamber 36, the upward direction of the expelled air, and the turbulence and upheaval caused by the large volume of air combine to transfer oxygen into the liquid. The upheaval propels the liquid over the top of divider wall 38 and into discharge chamber 40. The effluent flows from discharge chamber 40 through opening 42 at the base of discharge chamber 40.

The size and number of aerators 12 and apertures 17 are variables that are governed by the volume and pressure output of the source of air, the depth of immersion of aerators 12 in the liquid, and the size of reaction chamber 36. The required volume and pressure of air are governed by the amount of flow, the oxygen demand and depth of liquid in reaction chamber 36. Air input is regulated to provide sufficient pressure to overcome liquid head pressure to a point below the bottom row of apertures 17 but insufficient pressure to overcome liquid head pressure at the open bottom of aerators 12. This enables air to be expelled through apertures 17 and prevents escape of air through the open bottom. The requirements of these inter-related variables can readily be determined by one skilled in the art.

Advantages of the open bottom embodiment are these:
1. Loss of air pressure due to shutdown or malfunction of the system will enable liquid that may contain precipitated and suspended solids to enter aerators 12. Without agitation, the suspended solids settle and pass out of aerators 12 rather than settle within.
2. Self cleansing
3. Ease of maintenance In another embodiment, aerators 12 are enclosed with a bottom 14 as shown in FIG. 2A.

Figure 4:
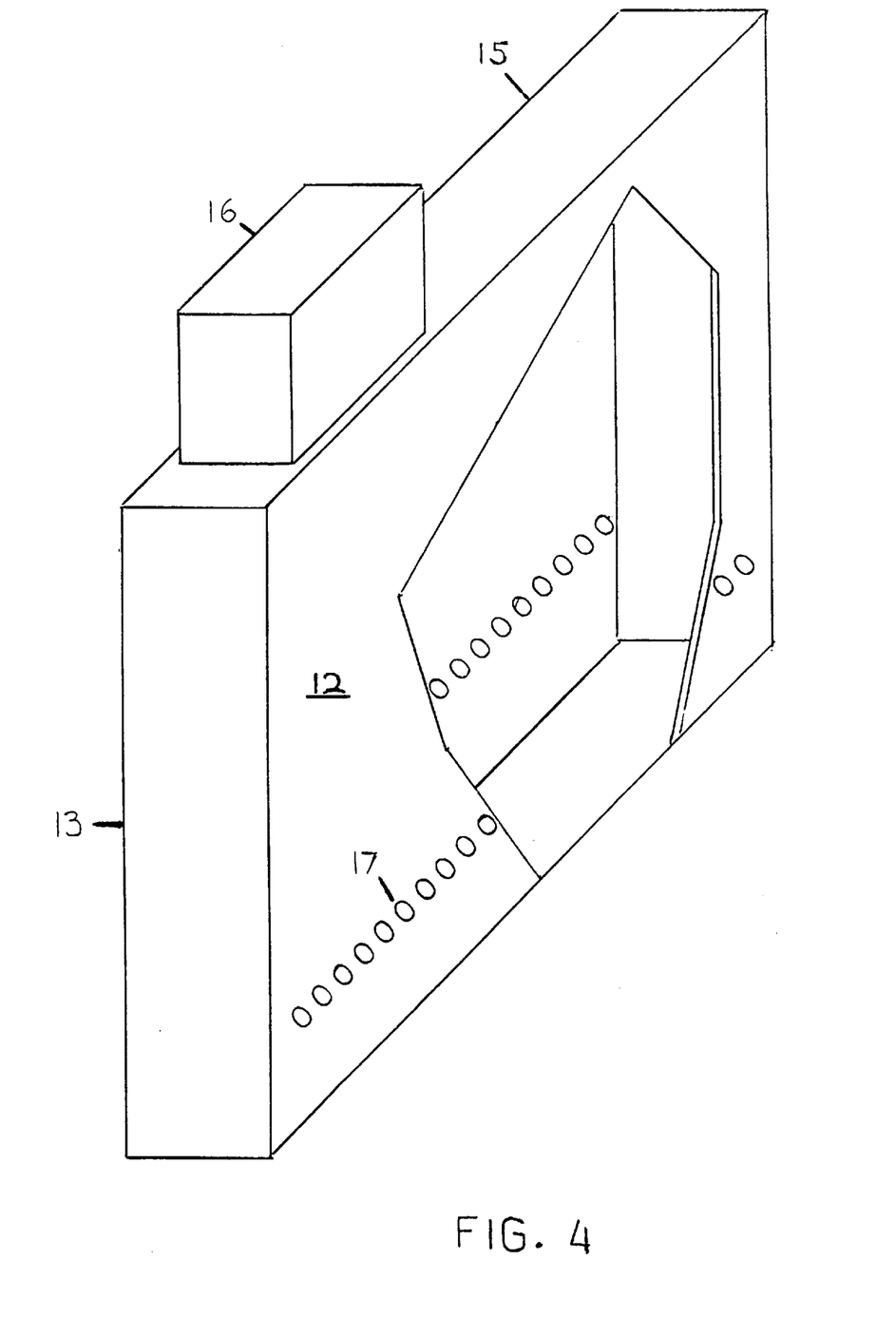
FIG. 4. is a partially broken away perspective view of an oblong shaped aerator with novel apertures on each side.

A primary feature of aerator 12 is the novel apertures 17 that virtually eliminate clogging and that can direct flow in predetermined directions. Any shape container can efficiently be used with these novel apertures. The preferred embodiment as shown in FIG. 1. recites aerators 12 as cylindrical. The embodiment shown in FIG. 4. depicts an oblong aerator 12A. The thickness of container 13 is recited as less than 1.58 millimeters (0.0625 inches). The present invention is in no way limited as to shape or thickness of aerator 12 or shape of aeration module 20. These and various other changes are possible, have been contemplated by the inventor, fall within the scope of the claims and should be apparent to one skilled in the art.

I claim:

1. An aeration apparatus comprising a container, said container having an inlet port, said inlet port in communication with a source of pressurized air and a source of liquid or granular chemicals, said container having a multiplicity of apertures, each of said apertures having a depressed leading edge and a raised trailing edge, said leading edge and said trailing edge formed at any pre-determined degree of angle, said leading edge and said trailing edge being diametrically opposed, said apparatus being the means to expel air into liquid for transfer of oxygen, mixing and agitation, wherein said apparatus is an integral part of an aeration module for continuous gravity flow treatment of liquids, said module comprising an infusion chamber for inflow of liquids, said infusion chamber separated from a reaction chamber by a baffle wall, said baffle wall extending to the top of said module, said baffle wall terminating above the bottom of said module to leave an open channel for underflow of liquid into said reaction chamber, said reaction chamber containing one or more of said aeration apparatus, said reaction chamber being separated from a discharge chamber by a divider wall, said divider wall extending to the bottom of said module, said divider wall extending to a lesser height than the top of said module to allow for overflow of liquid from said reaction chamber into said discharge chamber, said discharge chamber having an opening for discharge of liquid.

2. An apparatus as recited in claim 1 wherein a series of two or more of said modules are contiguously aligned, wherein said discharge chamber is eliminated in all of said modules except the final one of said series of modules, wherein liquid from each of said reaction chambers flows into said infusion chamber of each successive one of said modules and continues this pattern of flow until the last of said series of modules wherein the flow from the last of said reaction chambers flows into said discharge chamber at the end of the final one of said modules and discharges through said opening of said discharge chamber.

3. An apparatus as recited in claim 2 wherein liquid or granular chemicals are pneumatically conveyed by the source of air directly into said aeration apparatus contained within said aeration module, and expelled from said aeration apparatus into liquid for efficient mixing.

4. An apparatus as recited in claim 1 wherein liquid or granular chemicals are pneumatically conveyed by the source of air directly into said apparatus and expelled by said apparatus into liquid for efficient mixing.

5. An apparatus as recited in claim 2 wherein said apparatus is the means for repeated aeration of liquids to economically strip volatile organic compounds.

* * * * *